(12) United States Patent
Finkler et al.

(10) Patent No.: US 7,469,038 B2
(45) Date of Patent: Dec. 23, 2008

(54) CORRECTION METHOD FOR SOLID-STATE DETECTORS AND SOLID-STATE DETECTOR

(75) Inventors: Klaus Finkler, Spardorf (DE); Martin Spahn, Chicago, IL (US)

(73) Assignee: Siemens Aktiengesellschaft, Munich (DE)

( * ) Notice: Subject to any disclaimer, the term of this patent is extended or adjusted under 35 U.S.C. 154(b) by 203 days.

(21) Appl. No.: 11/499,831

(22) Filed: Aug. 4, 2006

(65) Prior Publication Data

US 2008/0292057 A1    Nov. 27, 2008

(30) Foreign Application Priority Data

Aug. 4, 2005    (DE) .................. 10 2005 036 811

(51) Int. Cl.
*H05G 1/64*    (2006.01)
(52) U.S. Cl. ..................................... 378/98.8; 378/207
(58) Field of Classification Search ............... 378/98.8, 378/62, 98.11, 98.12, 207
See application file for complete search history.

(56) References Cited

U.S. PATENT DOCUMENTS

| 5,381,014 | A | 1/1995 | Jeromin et al. |
| 2003/0016788 | A1* | 1/2003 | Spahn ..................... 378/98.8 |
| 2004/0200971 | A1 | 10/2004 | De Keyser |

FOREIGN PATENT DOCUMENTS

DE    44 22 366 C1    1/1996

OTHER PUBLICATIONS

M. Spahn, V. Heer, R. Freytag; "Flachbilddetektoren in der Röntgendiagnostik"; (Abstract); May 2003; pp. 1-2; Medical Solutions, Siemens AG; Forchheim, Germany.

\* cited by examiner

*Primary Examiner*—Hoon Song

(57) ABSTRACT

To guarantee a largely uncorrupted x-ray image for a solid-state detector with a pixel matrix featuring pixel elements comprising at least two plate elements arranged in one plane, whereby a first and a second plate element exhibit a displacement in relation to one another, a correction method is provided, whereby a digital raw x-ray image is read out from the pixel matrix and a discontinuity generated in the digital raw x-ray image by the displacement of the plate elements in relation to each other is removed at least partly from the image by an image processing correction. In accordance with an embodiment of the invention the second plate element has a displacement from the first plate element and the discontinuity generated is removed at least partly by an image processing correction from the section of the digital x-ray image which is formed by the pixel elements of the displaced second plate element.

19 Claims, 4 Drawing Sheets

CORRECTION METHOD FOR SOLID-STATE DETECTORS AND SOLID-STATE DETECTOR

CROSS REFERENCE TO RELATED APPLICATIONS

This application claims priority of German application No. 10 2005 036 811.5 filed Aug. 4, 2005, which is incorporated by reference herein in its entirety.

FIELD OF THE INVENTION

The invention relates to a correction method for solid-state detectors and to a solid-state detector.

BACKGROUND OF THE INVENTION

X-ray detectors are known from x-ray imaging which are embodied as solid-state detectors for recording digital x-ray images of an object to be examined, in which x-ray radiation is converted by a scintillator or a direct converter layer into electrical charge and subsequently read out electronically by means of active pixel matrixes. Subsequently the imaging data representing the examination results is transmitted to an evaluation and display unit and further processed to generate the image (article entitled, "Flachbilddetektoren in der Röntgendiagnostik" (solid-state detectors in x-ray diagnosis) by M. Spahn, V. Heer, R. Freytag, published in Radiologe magazine 43, 2004, pages 340 to 350).

Active pixel matrixes which are constructed from a plate made of amorphous silicon, a so-called a-Si plate, are known. To manufacture large-area solid-state detectors, a number of a-Si plates are butted up against each other by means of the so-called butting process, by being jointly glued onto a glass substrate for example. When the plates are being glued together however, it is generally not possible for technical reasons to avoid a displacement of the different a-Si plates in relation to each other. For each pixel axis the displacement usually lies within a double-digit percentage range of the length of one pixel element. The displacement results in a discontinuity in the raw x-ray image read out. This in its turn leads to corrupted object representations and artifacts. In addition, with linear combinations for example by subtraction of two raw x-ray images in each case artifacts can occur in the case of specific applications; These applications involve DSA (Digital Subtraction Angiography) or Dual Energy methods for example or quite generally methods in which at least two raw x-ray images are recorded at different times from each other.

SUMMARY OF THE INVENTION

The object of the present invention is to create a method through which an uncorrupted x-ray image of an object under examination can be obtained by means of digital solid-state detector.

The object is achieved in accordance with the invention by a correction method for solid-state detectors and by a solid-state detector as claimed in the independent claims; advantageous embodiments of the invention are the object of the dependent claims in each case.

Using the inventive correction method, with solid-state detectors with a pixel matrix consisting of at least two plate elements arranged in one plane, with a first and a second plate element being displaced in relation to each other, an x-ray image which is uncorrupted and especially also continuous at the displacement points can be achieved in that the discontinuity generated by the displacement of the plate elements to each other in the digital raw x-ray image is at least partly removed from the raw digital image using an image processing correction. A raw x-ray image within the context of the invention is taken to mean both a directly read-out x-ray raw image and also an already partly corrected, for example already offset-corrected raw x-ray image. One or more additional image processing steps can thus readily be undertaken between the reading out and the correction of the discontinuity.

In accordance with an embodiment of the invention, the second plate element is displaced in relation to the first plate element and the discontinuity produced by this is removed at least partly by an image processing correction from the part of the digital raw x-ray image which is formed from the pixel elements of the displaced second plate element. The fact that the entire raw x-ray image is not corrected, but only a part of it, advantageously allows computing effort and thereby also time and money for expensive processing units to be saved.

In an advantageous manner for a simple and straightforward correction, raw values of the pixel elements read out of the displaced second plate element are shifted by at least one pixel element length in the direction of the displacement. This enables the discontinuity to be corrected especially easily from the raw x-ray image.

To also allow compensation for displacement which lie in the range of a percentage of a pixel size, and thereby enable an especially precise correction of displacements to be undertaken, raw values of the pixel elements of the displaced second plate element are advantageously shifted by less than one pixel element length in the direction of the relevant displacement component. In accordance with a further embodiment of the invention the read out raw value of the pixel elements of the displaced second disk element is added to the raw value of the adjoining pixel element in the direction of the relevant displacement component corresponding to the relevant percentage displacement component related to a pixel element length and simultaneously subtracted from the raw value of the pixel element itself.

In an advantageous manner the displacement is measured and determined before the pixel matrix is read out. This makes data about the displacement available quickly and easily for the subsequent correction process. An especially advantageous method of measuring and determining the displacement is provided by the pixel matrix and thereby the displacement being optically scanned. In accordance with a further embodiment of the invention the displacement is determined by comparing the raw x-ray image of a known object, especially of a network grid, with an uncorrupted image of the known object. The displacement can for example be determined when the solid-state detector is being commissioned or during a calibration. Subsequently the displacement is expediently stored in a memory unit, so that it is able to be retrieved at any time if required.

An especially advantageous application of the invention is produced for a solid-state detector with a pixel matrix featuring pixel elements consisting of at least two plate elements arranged in a plane, with a first plate element and a second plate element having a displacement to each other, and with an assigned correction unit, through which an at least partial correction of a discontinuity from the raw x-ray image is provided, with the displacement being the cause of the discontinuity in the raw x-ray image.

BRIEF DESCRIPTION OF THE DRAWINGS

The invention, as well as further advantageous embodiments in accordance with features of the subclaims, are explained in more detail below with reference to schematic exemplary embodiments in the drawing, without the invention being restricted in any way to these exemplary embodiments; The Figures show:

DETAILED DESCRIPTION OF THE INVENTION

Figure 1:
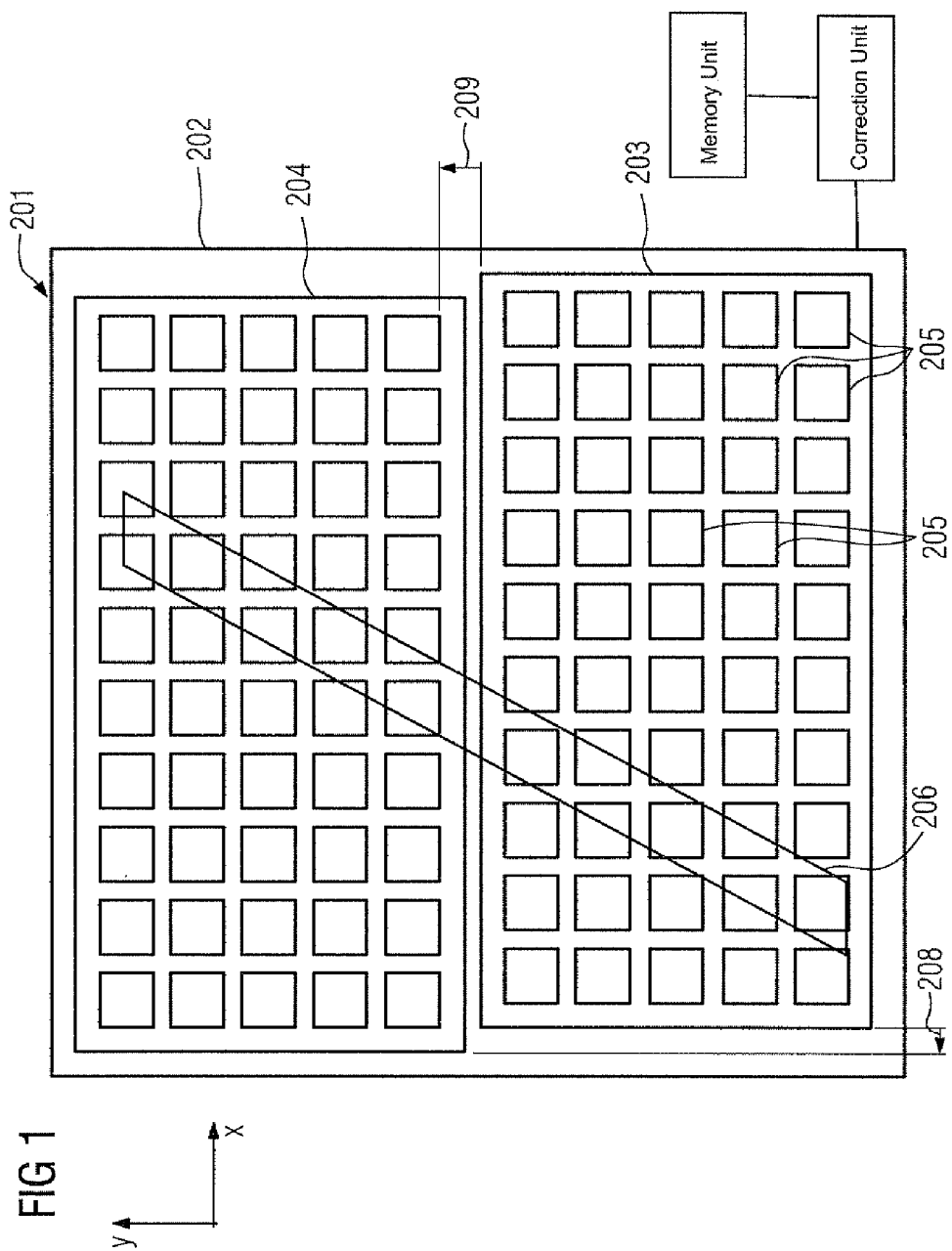
FIG. 1 a view from above of a pixel matrix made up of a first a-Si plate and a second a-Si plate arranged displaced from the first a-Si plate of a solid-state detector and of an object under examination.

FIG. 1 shows a pixel matrix 201 of a solid-state detector, which is made up of a first plate element and a second plate element, with both elements being glued to a glass substrate 202 and thereby being arranged in one plane. The first plate element is advantageously formed from a first a-Si plate 204 and the second plate element from a second a-Si plate 203. Each a-Si plate 203; 204 consists of a finite number of square-shaped pixel elements 205. The pixel elements measure raw values, which can for example be gray values, and which can then for example be displayed on a monitor as a raw x-ray image 210.

The first a-Si plate 203 and the second a-Si plate 204 are arranged displaced relative to one another, or for simpler definition the second a-Si plate 204 is shifted from the first a-Si plate 203 by a displacement 208; 209. The displacement 208; 209 of the second a-Si plate 204 in relation to the first a-Si plate 203 has a first displacement component 208 which is directed in the opposite direction to the first pixel axis x and has a second displacement component 209 which is directed in the direction of the second pixel axis y. The solid-state detector is provided for recording images of an object under examination 206.

Figure 2:
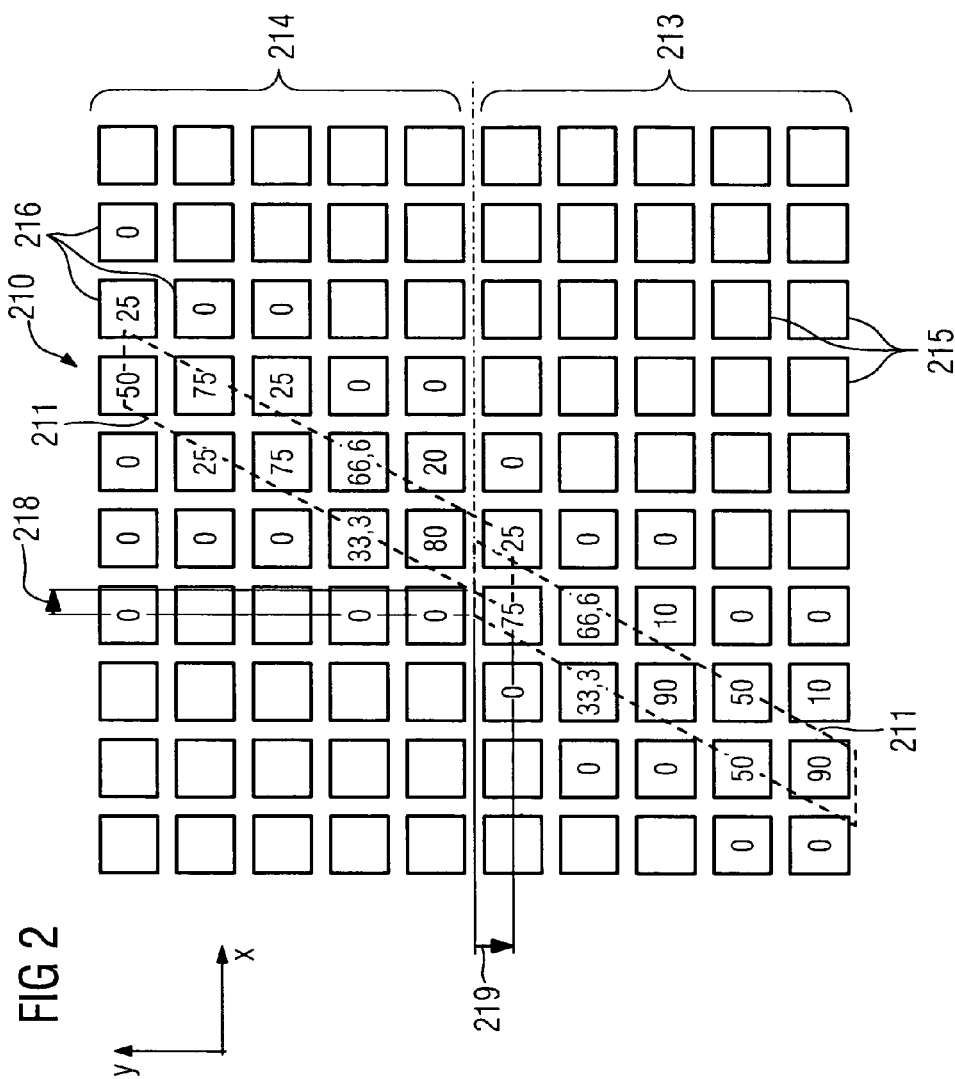
FIG. 2 a diagram of the gray values of an uncorrected raw x-ray image read out from the pixel matrix depicted in FIG. 1.

If a raw x-ray image 210 of the object under examination 206 is read out from the pixel matrix 201 and for example displayed on a monitor, especially in gray values, a discontinuity 218; 219—as shown in FIG. 2—can be seen in the area of transition between the first image section 213 read out from the first a-Si plate 203 and the image section 214 read out from the second a-Si plate 204. This occurs because known image processing software in accordance with the prior art does not take account of the displacement or of the discontinuity 218; 219 which it produces. The discontinuity 218; 219 has a first discontinuity component 218 which is directed along the first pixel axis x and has a second discontinuity component 219 which is directed in the opposite direction to the second pixel axis y, overall the discontinuity 218; 219 is precisely opposed to the displacement 208; 209.

FIG. 2 shows the raw x-ray image 210 in gray values with a range of values of 100 as an example, with a dashed line indicating the outline 211 of the object under examination 206 shown with the discontinuity 218; 219. The numbers on the first pixels 215 of the first image section 213 and the numbers on the second pixels 216 of the second image section 214 of the x-ray image 210 typically designate the gray values obtained corresponding to the object 206 on a scale of 0 (white) to 100 (black). With a usual solid-state detector there are far more $2^{14}=16384$, gray levels present.

Figure 3:
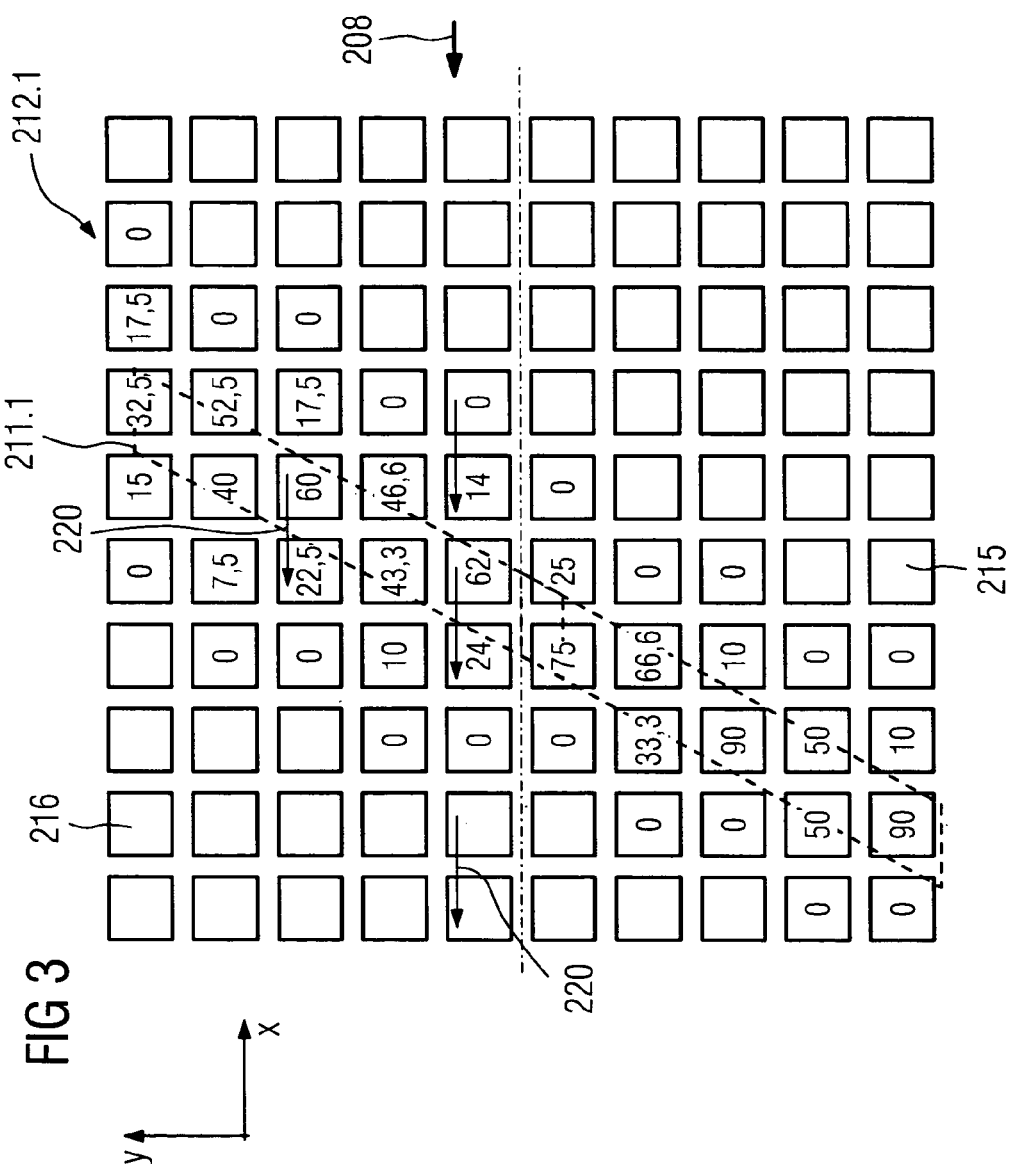
FIG. 3 a diagram of the gray values of an intermediate x-ray image read out from the pixel matrix depicted in FIG. 1 and part corrected in the direction indicated by the arrows.
Figure 4:
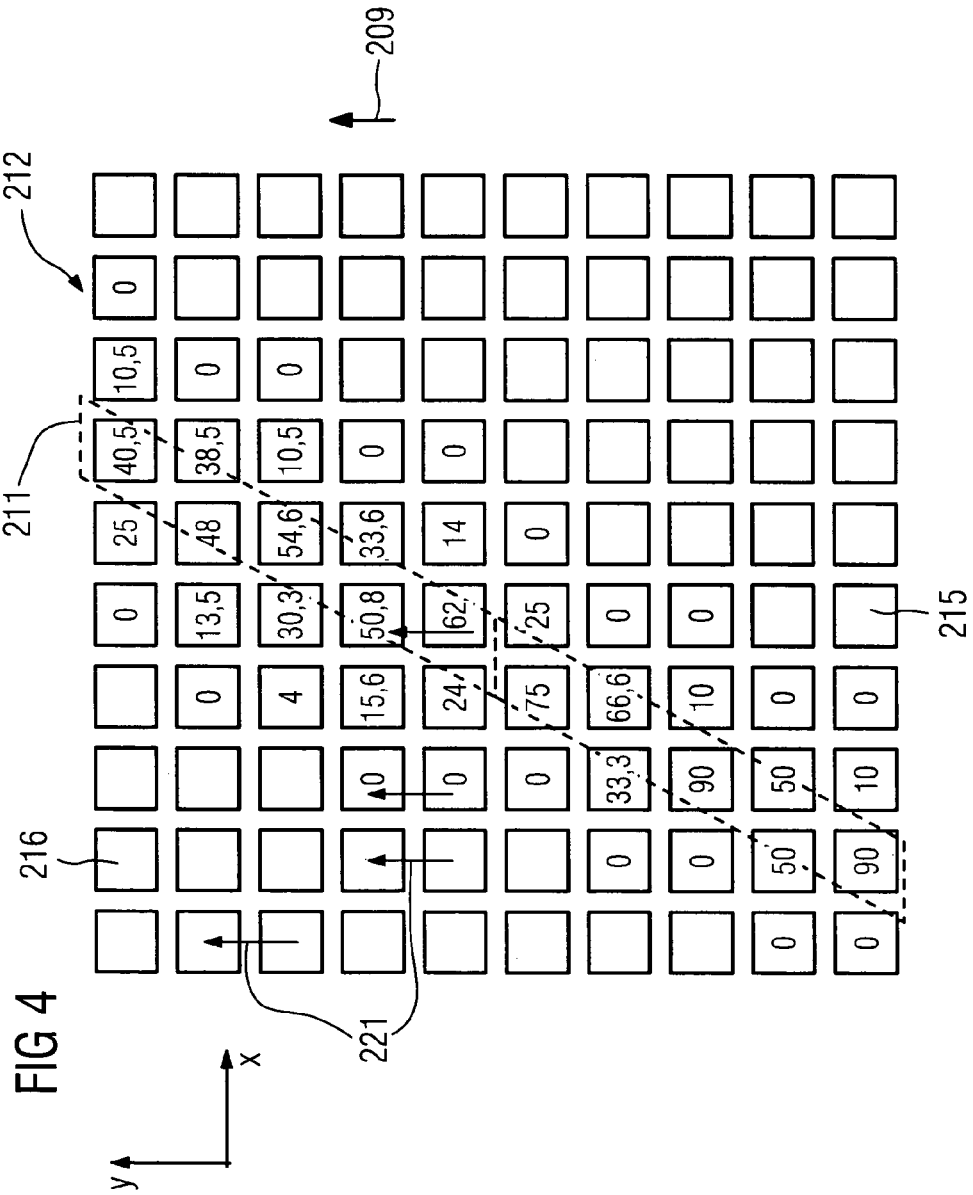
FIG. 4 a diagram of the gray values of an x-ray image corrected in accordance with the invention.

In accordance with the invention the discontinuity 218; 219 generated by the displacement 208; 209 of the plate elements, especially of the a-Si plates 203; 204 in the digital raw x-ray image 210 is removed at least partly from the raw x-ray image 210 using an image processing correction. The direction in which the method steps of the inventive correction method are applied, is indicated in FIG. 3 and FIG. 4 with reference to the arrows 220; 221 on the pixels of the second a-Si plate 204. A part-corrected intermediate x-ray image 212.1 produced by executing a correction method in the direction of the first arrows 220 in accordance with an embodiment of invention is shown in FIG. 3, an x-ray image 212 also corrected after the part correction in the direction of the second arrows 221 is shown in FIG. 4. In accordance with an embodiment of the invention the correction is first executed in the direction of one displacement component and then in the direction of the other displacement component.

If the displacement of the second a-Si plate 204 shown in FIG. 1 amounts in its first displacement component 208 for example to 30% of one pixel length and in its second displacement component 209 for example to 40% of one pixel length an advantageous embodiment of a correction method appears as follows: The relevant originally read out gray value of the pixel element 205 of the displaced second a-Si plate 204, which has adjoining pixel elements 205 on all sides of the second a-Si plate 204 is added by 30% to the pixel element 205 adjacent in the direction of the first displacement component 208, in the example to the left, and simultaneously 30% of the gray value is subtracted from the pixel element 205 itself.

After the conclusion of this shifting to the left 40% of the resulting intermediate gray value is added to the pixel element 205 adjoining in the direction of the second displacement component 209, i.e. upwards in the direction of the y-axis in the example, and 40% of the intermediate gray value resulting is subtracted in the pixel element 205 itself. The same method is used for gray values which are read out from pixel elements 205 of the second, displaced a-Si plate 204, and which have on all sides adjacent pixel elements 205 belonging to the second a-Si plate 204.

With edge pixel elements, that is pixel elements which do not have a directly adjacent pixel element of the same plate element on at least one side, i.e. of the second a-Si plate 204, a separate correction is provided for an even more accurate uncorrupted x-ray image: In accordance with a further embodiment of the invention the read-out raw value of the pixel elements 205 of the displaced second plate element which does not have an adjacent pixel element 205 in the direction of the side adjacent to the displacement, is subtracted for the pixel element 205 itself in accordance with the percentage displacement related to a pixel length.

In the example considered this involves the originally read out gray value of the pixel elements 205 of the displaced second a-Si plate 203, which has no adjacent pixel element 205 on the side adjacent to the direction of the displacement 208; 209, i.e. to the left and upwards. Since here nothing can be passed on to at least one side, only the subtraction for the gray value of the pixel element 205 itself is executed. Thus, for the pixel elements 205 without left-hand adjacent elements 70% of the gray value is removed, but only 40% of the gray value passed on, namely to the gray value of the pixel element above the element; The remaining 30% is lost.

In accordance with a further embodiment of the invention the raw value of the pixel elements 205 of the displaced second plate element read out which has no adjoining pixel element 205 of the side adjoining the relevant displacement component in the opposite direction is left. In the example described the gray values of the pixel a elements 205 are left in their originally read-out form which are positioned on the right edge and which adjoin the gray values which were read out from pixel elements 205 of the first a-Si plate 203.

For the latter gray values of the edge-side pixel elements the following method can also be employed: In accordance with a further embodiment of the invention the read-out raw value of the pixel elements 205 of the displaced second plate element which have no adjacent pixel element 205 on the side adjoining the relevant displacement component in the opposite direction, is increased by the percentage proportion specified by the relevant displacement component. In the example described the gray value of a pixel element 205 positioned at the right edge is thus increased by 30%, the gray value of a pixel element 205 positioned at the bottom edge by 40% of the originally read-out gray value.

The procedure for the latter edge-side gray values can also be as follows: In accordance with a further embodiment of the invention the read-out raw values of the pixel elements 205 of the displaced second plate element which adjoin the first plate element are increased by the percentage amount of the raw values of the adjacent pixel elements 205 of the first plate element predetermined by the relevant displacement components 208; 209. In the example described 40% of each gray value of the edge-side pixel elements of the first a-Si plate 203 which adjoin the second a-Si plate 204 are thus added to the gray values of the adjacent edge pixel elements above them of the second a-Si plate 204.

In accordance with a further embodiment of the invention there is a dead row and/or column arranged between the first and the second plate element from which no raw value is read out. In accordance with a further embodiment of the invention a value for the relevant dead row and/or column is calculated by interpolation of the raw value of the pixel element 205 adjacent to a side edge of the first plate element and the raw value of a pixel element 205 adjacent to a side edge of the second plate element, with the weighting of the relevant raw value depending on the corresponding displacement components 208; 209.

Before the calculation of the values for the dead row or column a correction of the discontinuity should already be performed in parallel to the relevant dead row and/or column. For a solid-state detector 201 with a dead row arranged between the first a-Si plate 3 and the second a-Si plate 204 a correction of the discontinuity in the direction of the first displacement component 208 is first performed accordingly.

Subsequently the values for the pixels of the dead row are computed by the gray value of the pixel element 205 of the second a-Si plate 204 adjacent in the direction of the second displacement component 209, and the grey scale value of the pixel element of the first a-Si-plate 203 adjacent in the opposite direction of the second displacement component, that is downwards, being averaged, with the weighting corresponding to the 40% displacement in this direction being included in the calculation. This is undertaken with the aid of a linear interpolation.

Subsequently a correction of the discontinuity, as described in FIG. 4, in the direction of the second displacement component 209 is undertaken, with the gray values of the edge pixel elements of the second a-Si plate adjoining the dead row being corrected by the values of the dead row. 40% of the relevant intermediate resulting gray value or, for the edge pixel elements, of the calculated value of the pixel elements of the dead row, is added to the adjacent pixel element 205 in the direction of the second displacement component 209, that is upwards, and for the pixel element 205 itself 40% of the intermediate resulting gray value is subtracted, with the values of the dead row being left.

To have data about the displacement available quickly and easily for subsequent correction processes, the displacement is measured and determined in an advantageous manner before the read-out of the pixel matrix. This can be done in a variety of ways, for example by optical scanning of the plate elements.

A further option consists of producing x-ray raw images of known objects, especially a network grid or simple lines, and then comparing the raw x-ray image with the actual objects. This allows the discontinuity to be seen directly and the displacement can be deduced. If the displacement is characterized it can be stored for later use for the inventive method in a memory unit in the solid-state detector or in an associated correction unit.

Instead of correcting the discontinuity from the proportion of the digital x-ray image which is formed from the pixel elements 205 of the displaced second plate element, a part of the discontinuity in each case, for example half, can be corrected from the first plate element and a second part, for example the second half, from the second plate element. The advantage of this is an evenly corrected x-ray image.

In addition an inventive correction method can also be used for a pixel matrix which is made up of more than two, for example of four or eight, plate elements. In this case for example the relevant discontinuity relating to the relevant plate element can be corrected from the part of the raw x-ray image concerned.

It is also possible for the displacement of the plate elements to each other, in addition to the linear displacement components along the pixel axes, to also exhibit a rotation of the plate elements in relation to each other. To correct this rotation a corresponding, suitable image processing method can be selected.

An inventive solid-state detector 201 comprises a pixel matrix featuring pixel elements 205 made up of at least two plate elements arranged in one plane, with the first plate element and a second plate element having a displacement relative to each other and an assigned correction unit through which at least a partial correction of a discontinuity of a raw x-ray image read out from the pixel matrix is provided, with the displacement being the cause of the discontinuity in that raw x-ray image.

Corrections, that is offset corrections, gain corrections and/or the described displacement correction for example, are generally undertaken in a correction unit which, although assigned to the solid-state detector, is arranged outside the unit. The correction unit can for example be located in an x-ray system or an image system to which the solid-state detector has a connection link. On the other hand however there can also be provision for example, with a mobile solid-state detector, for the entire correction unit to be integrated into the construction of the solid-state detector. This makes it possible to pass on a completely corrected x-ray image directly from the solid-state detector for post processing.

The invention is not restricted to the exemplary embodiment discussed at length above of an image processing correction method, but also includes all possible correction methods by means of which a discontinuity in the raw x-ray image generated as a result of a shifting of the plate elements in relation to each other can be at least partly removed from the digital raw x-ray image. Three further options will be briefly outlined below:

For example the proportion of the digital or x-ray image which is formed from the pixel elements of the shifted second plate element can for example be moved in its entirety in the direction of the displacement by a whole pixel element or by several whole pixel elements.

In addition a second degree polynomial can be applied by three raw values in each case of three pixel elements lying adjacent to each other in the direction of a pixel axis, in order to correct the central raw value. The central raw value is shifted along the curve of the polynomial in accordance with the percentage of the relevant displacement component or a new value is calculated and the raw value is replaced by the newly calculated or derived corrected value. This process is undertaken both in the direction of the first pixel axis and also in the direction of the second pixel axis for each raw value. Special process steps can again be performed for edge-pixel elements.

Furthermore a straight line can also be placed for example through three raw values of three adjacent pixel elements using a fit process, in order to process the central raw value. The central raw value is shifted along the straight line in accordance with the percentage of the displacement component concerned and the raw value is replaced by a corrected value obtained in this manner. This process is undertaken both in the direction of the first pixel axis and also in the direction of the second pixel axis for each raw value. In addition a minimization of the overall noise can also be achieved especially advantageously by using this method.

The invention can be briefly summarized as follows: To guarantee a largely uncorrupted x-ray image for a solid-state detector with a pixel matrix featuring pixel elements comprising at least two plate elements arranged in parallel in one plane, with a first and a second plate element being displaced in relation to one another, a correction method is provided, with a digital raw x-ray image being read out of the pixel matrix, and a discontinuity generated in the digital raw x-ray image by the displacement of the plate elements in relation to each other being removed at least partly from the image by means of an image processing correction. In accordance with an embodiment of the invention, the second plate element is displaced in relation to the first plate element and the discontinuity produced by this is removed at least partly by an image processing correction from the part of the digital raw x-ray image which is formed from the pixel elements of the displaced second plate element.

The invention claimed is:

1. A correction method for a solid-state detector in a medical image device, comprising:
   arranging a pixel matrix featuring a pixel element having a plurality of plate elements arranged in a plane;
   generating a displacement in relation to a first and a second plate element of the plate elements;
   reading out a read-out raw value of the pixel element of the displaced second plate element;
   shifting the read-out raw value of the pixel element of the displaced second plate element by at least one or less than one pixel element length in a direction of the displacement;
   adding the read-out raw value of the pixel element of the displaced second plate element to a raw value of an adjacent pixel element in the direction of the displacement according to a percentage of the displacement related to a pixel element length; and
   simultaneously subtracting the read-out raw value of the pixel element of the displaced second plate element from the raw value of the pixel element.

2. The correction method as claimed in claim 1, wherein the discontinuity generated is at least partly removed from a section of the digital raw x-ray image which is formed from the pixel element.

3. The correction method as claimed in claim 1, wherein the displacement has a first displacement component along a first pixel axis or a second displacement component along a second pixel axis.

4. The correction method as claimed in claim 1, wherein the correction is performed first in a direction of one displacement and then in a direction of another displacement.

5. The correction method as claimed in claim 1, wherein a read-out raw value of the pixel element of the displaced second plate element which does not feature an adjacent pixel element in the direction of the displacement is subtracted from the raw value of the pixel element by a percentage of the displacement related to a pixel element length.

6. The correction method as claimed in claim 1, wherein a read-out raw value of the pixel element of the displaced second plate element which does not feature an adjacent pixel element in an opposite direction of the displacement is increased by a percentage amount predetermined by the displacement.

7. The correction method as claimed in claim 1, wherein a read-out raw value of the pixel element of the displaced second plate element which adjoins the first plate element is increased by a percentage amount of a raw value of an adjacent pixel element of the first plate element predetermined by the displacement.

8. The correction method as claimed in claim 1, wherein a dead row or column of the pixel element with no raw value read out is arranged between the first and the second plate element.

9. The correction method as claimed in claim 8, wherein a value for the dead row or column is calculated by interpolating a raw value of a pixel element adjacent to a side edge of the first plate element and of a raw value of a pixel element adjacent to a side edge of the second plate element with a weighting factor depending on the displacement.

10. The correction method as claimed in claim 1, wherein the displacement is measured and determined before the pixel matrix is read out by:
    optical scanning of the pixel matrix, or
    comparing a raw x-ray image of an object with an uncorrupted image of the object.

11. The correction method as claimed in claim 10, wherein the displacement is determined and stored in a memory unit.

12. A solid-state detector in a medical image system, comprising:
    a pixel matrix featuring a pixel element;
    a plurality of plate elements comprised in the pixel element and arranged in one plane, with a first plate element and a second plate element having a displacement relative to one another; and
    a correction unit which:
        reads out a read-out raw value of the pixel element of the displaced second plate element,
        shifts the read-out raw value of the pixel element of the displaced second plate element by at least one or less than one pixel element length in a direction of the displacement,
        adds the read-out raw value of the pixel element of the displaced second plate element to a raw value of an adjacent pixel element in the direction of the displacement according to a percentage of the displacement related to a pixel element length, and
        simultaneously subtracts the read-out raw value of the pixel element of the displaced second plate element from the raw value of the pixel element.

13. The detector as claimed in claim 12, wherein the second plate element displaces from the first plate element and the discontinuity generated by the displacement from a section of the raw x-ray image which is read out from the pixel element of the displaced plate element is at least partially corrected by the correction unit.

14. The detector as claimed in claim 13, wherein a further plate element is arranged in the plane and exhibits a further displacement to the first plate element.

15. The detector as claimed in claim 12, wherein the plate elements are a-Si plates.

16. The detector as claimed in claim 12, wherein the displacement has a first displacement component along a first pixel axis or a second displacement component along a second pixel axis.

17. The detector as claimed in claim 12, wherein the correction comprises a raw value correction in a direction of the displacement.

18. The detector as claimed in claim 12, wherein the pixel element of the displaced second plate element has an adjoining pixel element of the displaced second plate element on all sides.

19. The detector as claimed in claim 12, wherein the displacement is stored in a memory unit.

* * * * *